(12) United States Patent
Courtois

(10) Patent No.: US 8,074,076 B2
(45) Date of Patent: Dec. 6, 2011

(54) METHOD TO PROTECT A CRYPTOGRAPHIC ASSEMBLY BY HOMOGRAPHIC MASKING

(75) Inventor: Nicolas Courtois, Meudon (FR)

(73) Assignee: Gemalto SA, Meudon (FR)

( * ) Notice: Subject to any disclaimer, the term of this patent is extended or adjusted under 35 U.S.C. 154(b) by 1285 days.

(21) Appl. No.: 11/568,958

(22) PCT Filed: May 11, 2005

(86) PCT No.: PCT/IB2005/001409
§ 371 (c)(1),
(2), (4) Date: Nov. 10, 2006

(87) PCT Pub. No.: WO2005/109183
PCT Pub. Date: Nov. 17, 2005

(65) Prior Publication Data
US 2008/0022126 A1    Jan. 24, 2008

(30) Foreign Application Priority Data
May 11, 2004   (EP) ..................................... 04291204

(51) Int. Cl.
*G06F 12/14*    (2006.01)

(52) U.S. Cl. ......... 713/189; 380/263; 380/277; 380/286

(58) Field of Classification Search ................... 713/189; 380/28, 277, 252, 263, 286
See application file for complete search history.

(56) References Cited

U.S. PATENT DOCUMENTS

2004/0168063 A1* 8/2004 Revital et al. ................. 713/172
2006/0193471 A1* 8/2006 Stehle ........................... 380/268

OTHER PUBLICATIONS

Elena Trichina et al., "Simplified Adaptive Multiplicative Masking for AES", CHES 2002, LNCS 2523, pp. 187-197, 2003.*
Hughes at el., "Admissible Digit Sets and a Modified Stern-Brocot Representation", pp. 11-19, http://phiwumbda.org/~jesse/papers/NIII-R0401.pdf, Feb. 2004.*
Sanchez-Avila et al., "The Rijndael Block Cipher (AES Proposal): A Comparison with DES", pp. 229-234, IEEE, 2001.*
Trichina E et al: "Simplified Adaptive Multiplicative Masking for AES" Lecture Notes in Computer Science, Springer Verlag, New York, NY, US, vol. 2523, 2002, pp. 187-197, XP001176599 ISSN: 0302-9743 abstract.
Golic J et al: "Multiplicative Masking and Power Analysis of AES" Cryptographic Hardware and Embedded Systems (CHES 2002), Aug. 13, 2002-Aug. 15, 2002 pp. 198-212, XP002344149 Berlin Heidelberg the whole document. Oswald E et al: "Secure and Efficient Masking of AES- A Mission Impossible? (version 1.0)" SCA-Lab Technical Report Series, Jun. 4, 2004, XP002315432 p. 1-p. 6.
Courtois N et al: An Algebraic Masking Methof to Protect AES Against Power Attacks, 'Online! XP002344150 Retrieved from the Internet: URL:eprint.iacr.org/20051204.pdf> 'retrieved on Sep. 8, 2005!.

* cited by examiner

*Primary Examiner* — Vivek Srivastava
*Assistant Examiner* — Hee Song
(74) *Attorney, Agent, or Firm* — Pehr B. Jansson; The Jansson Firm

(57) ABSTRACT

This invention relates to a method to protect an assembly implementing a cryptographic calculation process which uses a homographic function f of type:

$f(z)=(az+b)/(cz+d)$ when $(cz+d)$ is not equal to 0 and $f(-d/c)=a/c$ the function f operating on masked variables, wherein, for any k, if x is an input and $y=f(x+k)$ is an output of the function f, to pass directly from a masked value $x+m\_i$ (additive masking of type XOR) to a masked value $y+m\_j$, the method consists in comprises of performing this operation using a composition of several transformations operating on $GF(2^k)$ with addition of the infinite, defined as $(ax+b)/(cx+d)$, and of transformations which exchange two points.

18 Claims, 2 Drawing Sheets

For any $k$:

x is an input, and y = f(x + k) is an output of the function $f$:

Using a composition of several transformations $F\_i$ and $G\_j$ wherein $l \geq 1, j \geq 1$, each transformation $F\_i$ and $G\_j$ operating on the set $K'$ wherein $K' = K \cup oo$, and wherein $K = GF(2^{\wedge}k)$, wherein each transformation $F\_i(z)$ and $G\_j(z)$ are defined as:
$(az + b)/(cz + d)$ when $(cz + d) \neq 0$
$F\_i(-d/z)$ and $G\_j(-d/c) = oo$,
$F\_j(oo)$ and $G\_j(oo) = a/c$ <u>203</u>

Exchanging two points, e.g., by:

$E[u,v](x) = x$ if $x \neq$ to u or v
$E[u,v](u) = v$
$E[u,v](v) = u$
and wherein
$u = G\_1(\ldots (G\_n(o))$ and
$v = G\_1(\ldots G\_n(oo))$ <u>205</u>

METHOD TO PROTECT A CRYPTOGRAPHIC ASSEMBLY BY HOMOGRAPHIC MASKING

BACKGROUND OF THE INVENTION

1. Field of the Invention

This invention relates to a method to secure an electronic assembly implementing a cryptographic algorithm which uses a secret quantity such as a secret key. More precisely, the method aims to produce a version of the algorithm which is not vulnerable faced with a certain type of physical attack such as for example attacks—known as High-Order Differential Power Analysis—which attempt to obtain information concerning the secret key by studying the electrical consumption of the electronic assembly during execution of the calculation.

2. Description of the Related Art

1.1 The Context

The cryptographic algorithms considered here use a secret key to calculate output information according to input information. These algorithms have numerous applications: for example, an encryption, decryption, signature, signature check, authentication or non-repudiation, or other operation. Currently numerous applications base their security on the secret key cryptographic algorithms such as DES and more recently AES which since 2000 has become the world-wide encryption standard [see Joan Daemen, Vincent Rijmen: AES proposal: Rijndael.
The latest version is available on the Internet, http://csrc.nist.gov/encryption/aes/rijndael/Rijndael.pdf]. These cryptographic algorithms are studied in cryptography and have proved to be secure against the best attacks known. With these cryptographic solutions therefore, security depends mainly on the security of the secret key used. Unfortunately, neither the security of an item of data stored on a PC nor the security of a password remembered by a human can be taken seriously. It has therefore become essential to store secret quantities in independent secured modules such as the smart card.

1.2 The Problem

Protection of Embedded Algorithms

Although cryptographic algorithms are perfectly secure in the idealised mathematical world, this is no longer the case in the true world: the smart card radiates energy, consumes current and, as a result, cycle by cycle, information which depends on secret quantities escapes from the card.

To be truly secure, the intermediate data of the algorithm must not provide any information on said secret quantities. In addition, new attacks have been developed [refer to the following documents:

P. Kocher, J. Jaffe, B. Jun, Introduction to Differential Power Analysis and Related Attacks. Technical Report, Cryptography Research Inc., 1998. Available from http://www.cryptography.com/dpa/technical/index.html T. S. Messerges, Using Second-Order Power Analysis to Attack DPA Resistant software. In Proceedings of CHES'2000, LNCS 1965, pp. 238-251, Springer-Verlag, 2000.]

These are known as high-order attacks (for example "Second-Order DPA"). This means that the attacker combines the escaping information at two or more times during the execution of the cryptographic algorithm. To be protected against this type of attack, the fact that the intermediate data of the algorithm does not provide any information on the secret quantities is no longer sufficient. It must also be impossible to combine in an attack data obtained at different times during execution to obtain any information concerning the secret quantities.

1.3 The Constraints

A solution to the problem must not only provide protection against DPA type attacks, but it must also be possible to extend it to "Second-order DPA" attacks and higher. The solution must also satisfy reasonable constraints regarding the execution time and the amount of memory used. One objective of this invention is that the execution time and the memory should be, compared with a non-secured implementation, multiplied by a small constant which depends neither on the block size, nor on the number of AES iterations, which can be achieved with this invention.

This invention guarantees the AES security against first, second or higher DPA type attacks, SPA attacks or other electronic attacks and attacks via other hidden channels.

The remainder of this document describes a general solution particularly well-adapted to the AES algorithm but also applicable to other cryptographic algorithms. All the known solutions for this problem have been criticised for their level of performance and their memory use, and have been subjected to attacks published in the literature.

SUMMARY OF THE INVENTION

This invention relates to a method to secure an electronic system comprising a processor and a memory, implementing a cryptographic calculation process stored in the memory which uses a secret quantity k and which uses a homographic function f of type:

$$f(z)=(az+b)/(cz+d) \text{ when } (cz+d) \text{ is not equal to 0 and}$$

$$f(-d/c)=a/c$$

the function f operating on masked variables, wherein, for any k, if x is an input and $y=f(x+k)$ is an output of the function f, to pass directly from a masked value $x+m\_i$ (additive masking of type XOR) to a masked value $y+m\_j$, in performing this operation using a composition of several transformations operating on $GF(2^k)$ with addition of the infinite, defined as $(ax+b)/(cx+d)$, and of transformations which exchange two points.

This invention also concerns a system to implement said method.

BRIEF DESCRIPTION OF THE DRAWINGS

FIG. 2 is a flow diagram illustrating a methodology for protecting an cryptographic assembly.

DETAILED DESCRIPTION OF THE INVENTION

Figure 1:
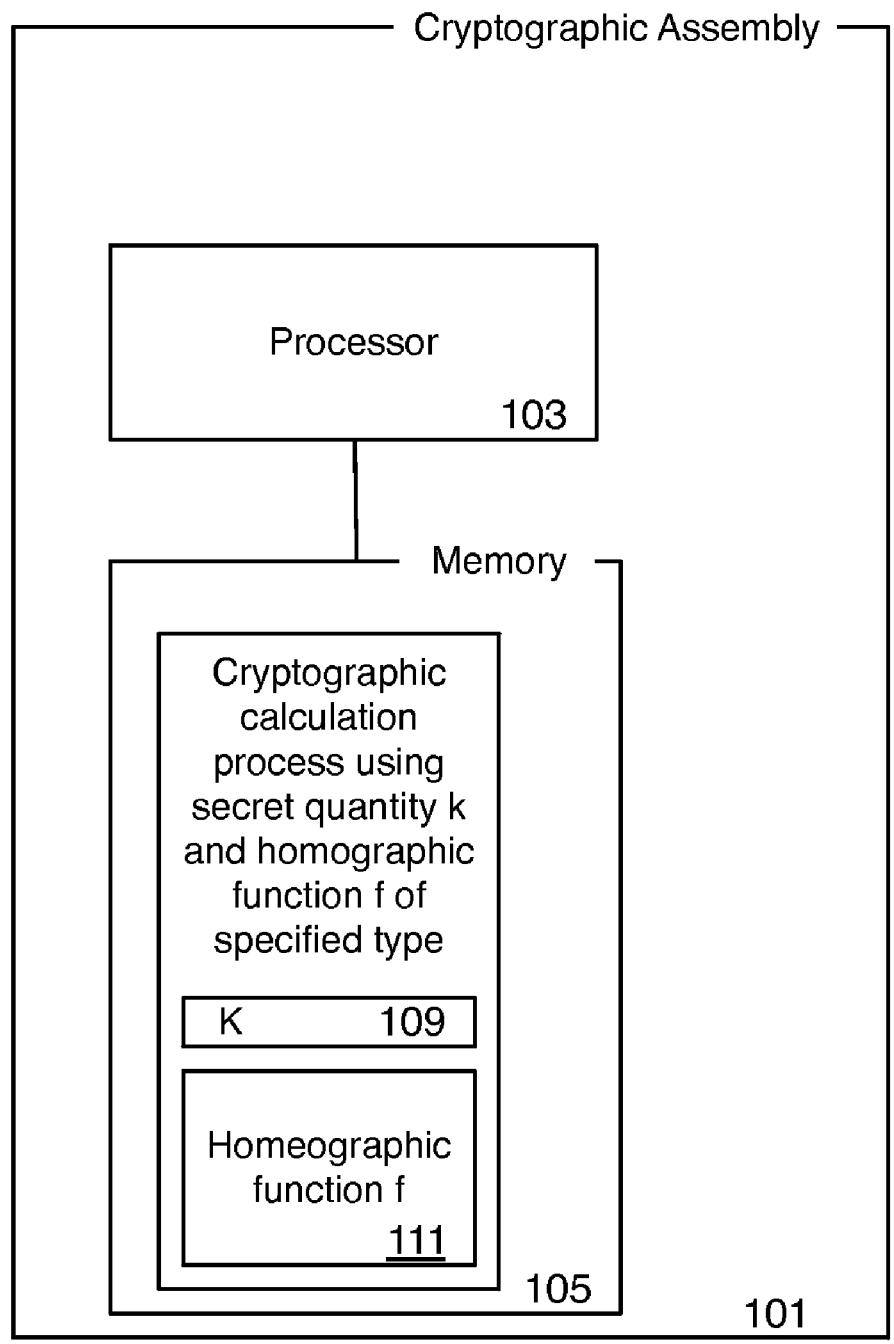
FIG. 1 is a block diagram illustrating a cryptographic assembly protected according to the principles described herein.

This invention relates to a method to secure an electronic system, e.g., a cryptographic assembly 101 illustrated in FIG. 1, having a processor 103 and a memory 105. The electronic system includes an implementation of a cryptographic calculation process 107 stored in the memory 105. The cryptographic calculation process 107 uses a secret quantity k 109 and a homeographic function f 111 defined as:

$f(z)=(az+b)/(cz+d)$ when $(cz+d)$ is not equal to 0 and $f(-d/c)=a/c$

The method consists of, as is illustrated in FIG. 2, for any k (process block 201, if x is an input and y=f(x+k) is an output of the function f, to pass directly from a masked value x+m_i (additive masking of type XOR) to a masked value y+m_j using (step 203) a composition of:

several transformations F_i and G_j wherein i z≧1 and j≧1, each transformation F_i and G_j operating on the set K' wherein K'=K oo, and wherein K=GF(2^k), each transformation F_i(z) and G_j(z) are defined as (az+b)/(cz+d) when (cz+d) is not equal to 0, F_i(-d/c) and G_j(-d/c)=oo, and F_j(oo) and G_j(oo)=a/c; and the exchange of two points (step 205).

Wherein for one embodiment, the exchange of two points is defined as:

$E[u,v](x)=x$ if $x$ not equal to either $u$ or $v$ $E[u,v](u)=v,$ $E[u,v](v)=u;$ and wherein $u=G\_1(\ldots G\_n(o))$ and $v=G\_1(\ldots G\_n(oo))$ The purpose of the method according to the invention is to secure an electronic system and for example an embedded system such as a smart card implementing a cryptographic calculation process using a secret key. The electronic system comprises a processor and a memory. The cryptographic calculation process is installed in the memory, for example ROM type, of said system. The processor of said system executes the calculation process by using a secret key, stored in a secret area of a memory, E2PROM type for example.

The method according to the invention consists in providing homographic protection.

We will first describe the general philosophy of the protection:

2.1 Breakdown Principle

Each cryptographic system can be broken down into a certain number of elementary operations such as addition, XOR, etc.

With AES, the operations can be divided into two categories:
- "Linear" operations, which are easily protected by traditional additive masking. This is known and is not the subject of this invention.
- If we remove the linear operations, we are left with a single operation, the Rijndael Inv operation, derived from the inverse operation in a finite body GF(256) or similar, with 0 which is mapped to 0.

We are only interested in protecting the Inv operation.

The solution described also applies to other similar operations.

2.2 Preliminaries

Let K be a finite body. In the case of AES K=GF(256). We assume that there exists some implementation of K, which is equivalent to implementing addition and multiplication in K. For example that defined in [AES].

Let Inv be the modified Rijndael inverse [AES], i.e.:

$Inv(x)=1/x$ in $K$ when $x$ is non null, $Inv(0)=0.$

We define K' by addition of a point known as infinite to K. Thus K'=K ∪ oo.

We define Inv' as the following operation:

$Inv'(x)=1/x$ in $K$ when $x$ is non null and not equal to oo, $Inv'(0)=oo,$ $Inv'(oo)=0.$ The invention considers that to calculate Inv, we can apply the composition of Inv' and of an operation which exchanges 0 and oo.

Let E[a,b] be an operation of K' in K' which exchanges the points a and b:

$E[a,b](x)=x$ when $x$ is not equal to either $a$ or $b$, $E[a,b](a)=b,$ $E[a,b](b)=a.$

2.3 How to Represent the Operation Inv

We have: For any x in K, (Inv is not defined on any K'):

$Inv(x)=Inv'(E[0,oo](x))$

The protection principle is as follows: Inv' is a member of a group stable by composition, of reasonable size, which is not the case of Inv. Consequently, we can make protections for Inv' which cannot exist for Inv.

This group is defined as being the set of the following functions:

For any 4-uplet (a,b,c,d) of elements of K such that ac<>bd, we define:

Function HOM[a,b,c,d]=the following function:

$HOM[a,b,c,d](x)=(ax+b)/(cx+d)$ in $K$ when $(cx+d)$ is not equal to 0.

$HOM[a,b,c,d](-d/c)=oo,$ $HOM[a,b,c,d](oo)=a/c.$

To implement Inv, we will write the following function K'→K' which coincides with Inv on the set K:

$Inv'o\ E[0,oo]$

The sign "o" denotes the composition of the usual functions.

We will then write Inv', as product of the homographic functions:

$Inv'=F\_1\ o\ F\_2\ o\ldots o\ F\_n\ o\ G\_1\ o\ldots G\_n$

Each of the functions F_i and G_j is in the form HOM[a, b,c,d].

Since Inv' belongs to a group, this breakdown is carried out arbitrarily. For example, we can choose 2*n−1 functions randomly and recalculate the missing function so that the composition makes Inv'.

We then obtain the following function K'→K' which coincides with Inv on K:

$F\_1\ o\ F\_2\ o\ldots o\ F\_n\ o\ G\_1\ o\ldots G\_n\ o\ E[0,oo]$

However, since in K' all these functions are bijective, we can calculate two points a and b such that this function is equal to $$F\_1 \circ F\_2 \circ \ldots \circ F\_n \circ E[a,b] \circ G\_1 \circ \ldots G\_n.$$

These points are a=G_1( . . . G_n(0)) and b=G_1( . . . G_n(oo)).

Our protection will be implemented as follows:

1. We will generate F_1, F_2, . . . , F_n, G_1, G_n. Each one is described by 4 elements of K, i.e. 4 bytes in Rijndael/ AES.

2. We will calculate a and b.

3. We will then apply this series of operations to calculate Inv.

4. In AES, there are several Inv. The series of operations carried out, as defined in 1-3, may vary from one calculation to another.

2.4 How to Protect the Operation Inv

In a secured implementation of AES, y=Inv(x) is not calculated from x, but instead calculated directly from the masked value x+m_i to obtain directly y+m_j, without using intermediate values x and y which provide information. We must therefore calculate the function $$y = Inv(x+m\_i) + m\_j$$

As with Inv, this function can be seen in numerous ways as a combination of the basic operations in the form HOM[a,b,c,d] and exchanges of two points.

It is even recommended to go further. Let K_i be an intermediate key of AES. The operation x|→Inv (x+K_i) can be protected directly in the same way. After exchanging two points, this operation is equal on any K to a certain HOM[a,b,c,d]:K'→K' in the group, which can be broken down in the same way as for Inv. In an implementation protected by an additive mask, we will need to break down the function:

$$x | \to Inv(x+K\_i+m\_i)+m\_j$$

Which is carried out in the same way.

2.5 Improvements

Instead of one operation, we can use several operations E[a,b].

It is easy to see that for each operation HOM[a,b,c,d], we may assume that a is equal to 0 or 1.

Although the same method can also be used to protect the implementation when additive or multiplicative masking is used, this is not recommended. These maskings are not bijective or fix certain points, for example multiplicative masking does not mask 0. A homographic masking of any type will always be bijective, but involves the need to store one of 257 values, which is not very practical—cannot be stored on 1 byte.

This document does not describe the entire AES protected implementation.

Its objective is to describe how to protect the non-linear component, which is the most difficult to protect. Protection of the assembly may and must include other traditional protections which are widely known.

This invention therefore relates, in the special form of realisation described, to a method to protect an assembly implementing a cryptographic calculation process which uses at least a function Inv (Inverse in GF(2^k) with 0 mapped to 0 as in AES) with intermediate variables x of the calculation handled with an additive masking x+m_i, with m_i being the mask and + being the XOR operator, characterised in that, for any k, if x is an input and y=f(x+k), to pass directly from the masked value x+m_i to a masked value y+m_j without disclosing intermediate values, this operation is carried out using the composition of several transformations operating on GF(2^k) with addition of the infinite, defined in the form (ax+b)/(cx+d) and of transformations which exchange two points.

It also relates to a system comprising storage means implementing a cryptographic calculation process which uses the function Inv (Inverse in GF(2^k) with 0 mapped to 0 as in AES) with intermediate variables x of the calculation handled with an additive masking x+m_i, with m_i being the mask and + being the XOR operator, characterised in that, for any k, if x is an input and y=Inv(x+k), to pass directly from the masked value x+m_i to a masked value y+m_j without disclosing intermediate values, we will see this operation as a composition of several transformations operating on GF(2^k) with addition of the infinite, defined in the form (ax+b)/(cx+d) and of transformations which exchange two points.

The invention claimed is:

1. A method to protect an assembly having a processor and a memory, the method comprising:
    operating the processor of the assembly according to instructions stored in the memory to cause the processor to perform the steps:
    performing a cryptographic calculation process that uses a homographic function f of the type:

$$f(z)=(az+b)/(cz+d) \text{ when } (cz+d) \text{ is not equal to 0 and}$$

$$f(-d/c)=a/c$$

by operating on masked variables, wherein, for any k, if x is an input and y=f(x+k) is an output of the function f, to pass directly from a masked value x+m_i (additive masking of type XOR) to a masked value y+m_j using a composition of:
        several transformations F_i and G_j wherein i≧1 and j>1, each transformation F_i and G_j operating on the set K' wherein K'=K U oo, and wherein K=GF(2^k), each transformation F_i(z) and G_j(z) are defined as (az+b)/(cz+d) when (cz+d) is not equal to 0, F_i(-d/c) and G_j(-d/c)=oo, and F_j(oo) and G_j(oo)=a/c; and
        the exchange of two points.

2. The method according to claim 1, wherein the operation f is the function Inv (Inverse in GF(2^k) with 0 mapped to 0 as in AES).

3. The method according to claim 1 or 2, wherein the calculation process protected is Rijndael or AES.

4. The method according to claim 3, wherein instead of additive masking of x by x+m, the masking is carried out for any homographic operation: instead of x, the value of (ax+b)/(cx+d) is handled.

5. The method according to claim 1 or 2, wherein the operations are implemented using tables.

6. The method according to claim 1 or 2, used to protect an implementation in a smart card, USB token, cryptographic module or other specialised hardware.

7. The method according to claim 1 or 2, used to protect a software implementation with "code obfuscation" (a virtual smart card).

8. The method according to claim 1 or 2, used to protect an implementation executed in an obscure manner on a remote server (another type of virtual smart card).

9. The method of claim 1 wherein the transformation to exchange two points is an operation that exchanges u and v using an operation defined as E[u,v](x)=x when x is not equal to either u or v, and otherwise, E[u,v](u)=v and E[u,v](v)=u and wherein the transformation to exchange two points is introduced in the composition of several transformations F_i and G_j according to the composition:

$$F\_1 \, o \ldots o \, F\_n \, o \, E[u,v] \, o \, G\_1 \, o \ldots G\_n$$

wherein
u=G_1( ... G_n(o)) and
v=G_1( ... G_n(oo)).

10. Electronic system including storage means comprising: a calculation process means to process a cryptographic calculation process which uses a homographic function f of type:

$$f(z)=(az+b)/(cz+d) \text{ when } (cz+d) \text{ is not equal to 0 and}$$

$$f(-d/c)=a/c$$

by operating on masked variables, wherein the function f includes means, for any k, if x is an input and y=f(x+k) is an output of the function f, to pass directly from a masked value x+m_i (additive masking of type XOR) to a masked value y+m_j, to perform this operation using a composition of:
several transformations F_i and G_j wherein i≧1 and j≧1, each transformation F_i and G_j operating on the set K' wherein K'=K ∪ oo, and wherein K=GF(2^k), each transformation F_i(z) and G_j(z) are defined as (az+b)/(cz+d) when (cz+d) is not equal to 0, F_i(-d/c) and G_j(-d/c)=oo, and F_j(oo) and G_j(oo)=a/c and
the exchange of two points.

11. The electronic system of claim 10 wherein the transformation to exchange two points is an operation that exchanges a and b using an operation defined as E[u,v](x)=x when x is not equal to either a or b, and otherwise, E[u,v](u)=v and E[u,v](v)=u and wherein the transformation to exchange two points is introduced in the composition of several transformations F_i and G_j according to the composition:

$$F\_1 \, o \ldots o \, F\_n \, o \, E[u,v] \, o \, G\_1 \, o \ldots G\_n$$

wherein
u=G_1( ... G_n(o)) and
v=G_1( ... G_n(oo)).

12. A program storage medium readable by a computer, comprising a program of instructions executable by the computer to perform method steps to process a cryptographic calculation process which uses a homographic function f of type:

$$f(z)=(az+b)/(cz+d) \text{ when } (cz+d) \text{ is not equal to 0 and}$$

$$f(-d/c)=a/c$$

by operating on masked variables, wherein the function f includes means, for any k, if x is an input and y=f(x+k) is an output of the function f, to pass directly from a masked value x+m_i (additive masking of type XOR) to a masked value y+m_j, to perform this operation using a composition of:
several transformations F_i and G_j wherein i≧1 and j≧1, each transformation F_i and G_j operating on the set K' wherein K'=K ∪ oo, and wherein K=GF(2^k), each transformation F_i(z) and G_j(z) are defined as (az+b)/(cz+d) when (cz+d) is not equal to 0, F_i(-d/c) and G_j(-d/c)=oo, and F_j(oo) and G_j(oo)=a/c and
the exchange of two points.

13. The program storage medium according to claim 12, wherein the operation f is the function Inv (Inverse in GF(2^k) with 0 mapped to 0 as in AES).

14. The program storage medium according to claim 12, wherein the calculation process protected is Rijndael or AES.

15. The program storage medium according to claim 14, wherein instead of additive masking of x by x+m, the masking is carried out for any homographic operation: instead of x, the value of (ax+b)/(cx+d) is handled.

16. The program storage medium according to claim 12, wherein the operations are implemented using tables.

17. The program storage medium of claim 12 wherein the transformation to exchange two points is an operation that exchanges a and b using an operation defined as E[u,v](x)=x when x is not equal to either u or v, and otherwise, E[u,v](u)=v and E[u,v](v)=u and wherein the transformation to exchange two points is introduced in the composition of several transformations F_i and G_j according to the composition:

$$F\_1 \, o \ldots o \, F\_n \, o \, E[u,v] \, o \, G\_1 \, o \ldots G\_n$$

wherein
u=G_1( ... G_n(o)) and
v=G_1( ... G_n(oo)).

18. A method to protect an assembly having a processor and a memory, the method performing a cryptographic calculation process, comprising:
define a set of transformations F_i(z) and G_j(z) operating on the set K' wherein K'=K Li oo, and wherein K=GF(2^k) and wherein each transformation F_i(z) and G_j(z) has the form
F_i(z) and G_j(z)=(az+b)/(cz+d) when (cz+d) is not equal to 0,
F_i(-d/c) and G_j(-d/c)=oo, and
F_j(oo) and G_j(oo)=a/c;
wherein the cryptographic calculation process includes operating the processor of the assembly according to instructions stored in the memory to cause the processor to perform the steps:
computing a function Inv defined as a composition of a plurality of transformations F_i(z) and G_j(z), i=1 to n by performing the composition $$F\_1 \, o \ldots o \, F\_n \, o \, E[u,v] \, o \, G\_1 \, o \ldots G\_n$$

wherein
E[u,v](x)=x if x not equal to either u or v,
E[u,v](u)=v,
E[u,v](v)=u;
and wherein
u=G_1( ... G_n(o)) and
v=G_1( ... G_n(oo)).

* * * * *